United States Patent
Muenzner et al.

(10) Patent No.: US 7,613,385 B2
(45) Date of Patent: Nov. 3, 2009

(54) HEATING DEVICE FOR AN ELECTRICAL APPLIANCE

(75) Inventors: Rainer Muenzner, Schwarzenberg (DE); Daniel Schuemann, Dresden (DE)

(73) Assignee: E.G.O. Elektro-Geraetebau GmbH, Oberderdingen (DE)

(*) Notice: Subject to any disclaimer, the term of this patent is extended or adjusted under 35 U.S.C. 154(b) by 135 days.

(21) Appl. No.: 11/354,467

(22) Filed: Feb. 14, 2006

(65) Prior Publication Data
US 2006/0191496 A1    Aug. 31, 2006

(30) Foreign Application Priority Data
Feb. 15, 2005    (DE) .................. 10 2005 007 935

(51) Int. Cl.
*H05B 3/40* (2006.01)
(52) U.S. Cl. .................. 392/497; 392/485; 392/488
(58) Field of Classification Search ............ 392/485, 392/488, 497
See application file for complete search history.

(56) References Cited

U.S. PATENT DOCUMENTS

| | | | |
|---|---|---|---|
| 4,733,798 A | 3/1988 | Brady et al. | |
| 5,216,743 A * | 6/1993 | Seitz | 392/490 |
| 5,315,847 A | 5/1994 | Takeda et al. | |
| 6,246,831 B1 * | 6/2001 | Seitz et al. | 392/486 |
| 2002/0047006 A1 * | 4/2002 | Cline et al. | 219/497 |

FOREIGN PATENT DOCUMENTS

| | | |
|---|---|---|
| CN | 2149409 Y | 12/1993 |
| CN | 2150232 Y | 12/1993 |
| CN | 2192640 Y | 3/1995 |
| CN | 1428476 A | 7/2003 |
| DE | 195 41719 | 5/1997 |
| EP | 1426467 A1 * | 6/2004 |
| EP | 1530041 A1 * | 5/2005 |

OTHER PUBLICATIONS

European Search Report from European Application No. EP06002612.7-2314 dated Aug. 23, 2006.
European Search Report from European Application No. EP06002612.7-2314 dated May 31, 2006, Apr. 16, 2007.
Chinese Office Action dated Mar. 13, 2009 for Chinese Application No. 200610071150.7.

* cited by examiner

*Primary Examiner*—Thor S Campbell
(74) *Attorney, Agent, or Firm*—Alston & Bird LLP

(57) ABSTRACT

A heating device is provided in a water passageway in a washing or rinsing machine and has a heating element in proximity with a sensor. In one embodiment, the heating element is mounted using a holder in an opening in a wall wherein the wall forms the water passageway. On the holder is also provided a conductivity measuring device which projects into the water passageway. The heating device and conductivity measuring device form a module.

16 Claims, 3 Drawing Sheets

HEATING DEVICE FOR AN ELECTRICAL APPLIANCE

CROSS REFERENCE TO RELATED APPLICATIONS

This application claims priority from German Application No. 102005007935.0, which was filed Feb. 15, 2005, of which the contents are hereby incorporated by reference.

FIELD OF APPLICATION

The invention relates to a heating device for a water-conducting electrical appliance or such an appliance operating with polluted water, which has a water passageway, particularly for a domestic electrical appliance such as, for example, a washing or rinsing machine. The heating device has at least one heating element which is placed on or in a water passageway.

BACKGROUND AND PRIOR ART

A heating device for a domestic electrical appliance is, for example, known from European patent EP 421 442 B1. In the latter portion, a description is given of a drum washing machine having a heating device, which is passed through the wall in the lower area of an outer tub. The passage point of the heating device in the wall is sealed by means of a holder of the heating device.

European patent application EP 633 342 A1 for example discloses a method and a device for optimizing detergent use. A device for determining the conductivity is for this purpose installed in the water supply line of a washing or rinsing machine and establishes the conductivity of the water. The water conductivity changes as a function of the ions dissolved in the water or the degree of calcification. The conductivity of the cleaning liquid cannot, however, be determined with such a method or device.

Therefore the problem to be solved by the invention is to provide a heating device permitting a further optimization of the detergent requirement in an automated cleaning process as a result of improvements to the measurement and in particular there is to be a better adaptation to the cleaning process. Water and time are saved and the washing or laundry is washed more carefully or gently. Simultaneously, the invention aims at reducing the working steps in installing the measuring systems.

SUMMARY OF INVENTION

This problem is solved by a heating device for a water-conducting electrical appliance having a water passageway, the heating device having at least one heating element. The latter is located on, or inside, of the water passageway, wherein the wall of the water passageway has in the vicinity of the heating device an opening. A conductivity measuring device is provided in such a way that it projects into the area of the opening or through the opening in the water passageway. Advantages and preferred developments of the invention form the subject matter of the claims and are described in greater detail hereinafter. By express reference, the wording of the claims is made into part of the content of the description.

According to one development of the invention, the wall of the water passageway has an opening where a conductivity measuring device is so positioned in the vicinity of the heating device that it projects into the water passageway.

According to a development of the invention a conductivity measuring device can, with particular advantages, be placed on the holder of the heating device and projects into the water passageway. Various advantages result from the combination of the heating device and a conductivity measuring device. Firstly several functionally important parts of an electrical appliance are combined in one module forming a preassembled module, so that in an electrical appliance assembly sequence, for example on an assembly line, less working steps and work stations have to be provided. Secondly, the device according to the invention for example makes it possible to retrofit an existing electrical appliance with a conductivity measuring device, without any need for interventions in a water passageway wall.

According to a development of the invention, a recess for receiving the conductivity measuring device is provided on the holder and in it the conductivity measuring device can be engaged, which permits both a passage and a fastening.

According to another development of the invention, the heating element is placed flat on the outside of the wall and can cover a significant part of the outer surface. For example, the water passageway is tubular in shape, particularly in the form of a so-called heating tube. The heating element is then a heating conductor, for example, a flat, resistive-heating wire spirally wound onto the outside of the water passageway. However, the heating element can also be manufactured or applied in a thick-film process, in the form of heating loops, for example using a screen printing process or the like.

The conductivity measuring device can project as a single part into the water passageway and can be a single piece or relatively wide. It advantageously completely fills the opening in the water passageway wall and seals it, particularly with a pin or base.

According to another development of the invention, the conductivity measuring device has at least one terminal, a pin and a sensor area. Preferably, there are at least two sensors for determining the conductivity on the sensor area. The pin is elongated or cylindrical, and has the sensor area at one end. At the opposite pin end is provided the terminal, which can for example be constructed with connectors, screwed contacts or with any other electrical contacting means.

Starting from a holder area outside the wall, the conductivity measuring device is introduced into the holder recess in such a way that the connection area projects from the holder and is partially located outside the water-conducting parts. On the opposite holder side, the sensor area projects therefrom in such a way that the sensors are completely free.

In a development of the invention, the sensors are constructed as electrodes by means of which it is possible to determine the electrical resistance or conductivity of the water. The determination of the electrical resistance of an object advantageously constitutes a possibility for determining its conductivity. The conductivity can be directly or indirectly measured, direct measurement being more advantageous. Measured values can be directly used.

In a development of the invention, the electrodes are constructed as capacitor plates for determining the water permittivity or dielectricity. By simple calculations the water conductivity can be determined from the permittivity. Advantageously, only one electrical field is introduced into the water, so that no currents can flow out, for example, via the casing.

In a development of the invention, the sensors are constructed as coils by means of which the water permeability can be determined. By simple calculations, the water conductivity can be established from the permeability. In this development, once again in advantageous manner no current is introduced into the water.

In a further development of the invention, the sensors have a corrosion-resistant construction and are preferably coated with at least one corrosion-resistant material. This construction of the sensors is particularly advantageous, because detergents can be added to the water which may react with many materials and can transform the same, so that the characteristics thereof change in an unforeseeable manner. The electrodes can for example be made from stainless, chemical-resistant steel or high-quantity steel. If a corrosion-resistant coating is provided, it can for example be of plastic.

The electrodes can also comprise semiconductor material, which has an insulation of an oxide. Due to this construction, a limited surface roughness can be obtained, which makes the deposition of dirt and contaminants more difficult. The latter could in fact lead to inaccurate measurements. Silicon can, for example, be used as the electrode material. Insulation can take place with a tantalum pentoxide coating, which can have a thickness in the nano-meter range.

Advantageously, the sensor area is elongated and projects substantially vertically from the holder. In this way a particularly narrow, space-saving design of the device can be obtained. The heating device or heating element is elongated and preferably has a gap, or area of free space, in which the sensor area is located. The sensor can run within or surround the heating device. The sensor area can in this way be completely integrated into the design of the heating device or heating element. Thus, the device can be located at the place on the electrical appliance where the heating element is provided without it being necessary to create extra space. Electric leads in the form of a cable harness or the like are already present here.

In a development of the invention, the conductivity measuring device has a certain spacing from the heating element. As a result water can flow completely around the conductivity measuring device, so that in an advantageous manner measuring errors can be avoided. In addition, the thermal energy of the heating element is not transmitted directly to the conductivity measuring device, but instead first to the water. This avoids damage to the conductivity measuring device which could embrittle the conductivity measuring device due to high temperatures.

In a development of the invention, the terminal, pin and sensor material are made from a corrosion-resistant material. Said material is preferably plastic, which is for example injection moulded around the sensor area and its connecting devices using an injection moulding process. Injection moulding advantageously make it possible to rapidly produce large numbers of objects.

In a development of the invention, the conductivity measuring device is produced in one piece. This creates a module or subassembly, which can easily be fixed in a single operation into the heating device holder.

In a development of the invention, the sensors are connected at the terminal to connector assemblies by electrically conductive connections passed through the pin. Thus, no further recesses have to be provided in the holder for the passage of the connecting devices. The provision of connecting devices in the pin also makes it possible to give an all-round closed design to the conductivity measuring device in the region projecting into the water. In a further development of the invention, the recess in the holder is constructed in corresponding manner to the conductivity measuring device and preferably corresponds to the pin, so that a sealing effect can be obtained. In a further development of the invention the conductivity measuring device is placed in sealed manner in the holder. As a result of the two aforementioned developments, in the vicinity of the conductivity measuring device, no further sealing means need be provided, which further reduces assembly costs.

In a development of the invention, the connection between the conductivity measuring device and the holder is twist-proof and the latter effect is preferably brought about in that the sensors of the conductivity measuring device are vertically oriented in the fitted state of the device. Advantageously, in this way, deposits do not collect on the sensors, which could unforeseeably falsify a measured result in the long term.

In a development of the invention, the holder is placed in sealed manner in a recess in the water passageway wall. Consequently, water from the area surrounded by the wall advantageously does not pass out of the water passageway.

In a development of the invention, there is an evaluating device for evaluating the sensor signals of the conductivity measuring device. The evaluating device is preferably constructed for correcting a determined conductivity value by means of a correction value, which is falsified by the locally higher water temperature as a result of the close proximity to the heating element. The correction of the measured value is necessary, because water with a higher temperature has a higher conductance than the same water with a lower temperature. The correction value can for example be established in a series of tests.

These and further features can be gathered from the claims, description and drawings and the individual features, both singly and in the form of subcombinations, which can be implemented in an embodiment of the invention. The features can be implemented in other fields and can represent advantageous, independently protectable constructions for which protection is claimed here. The subdivision of the application into individual sections and the subheadings in no way restricts the general validity of the statements made thereunder.

BRIEF DESCRIPTION OF THE DRAWINGS

Embodiments of the invention are described in greater detail hereinafter relative to the attached diagrammatic drawings, wherein show.

DETAILED DESCRIPTION OF THE DRAWINGS

Figure 1:
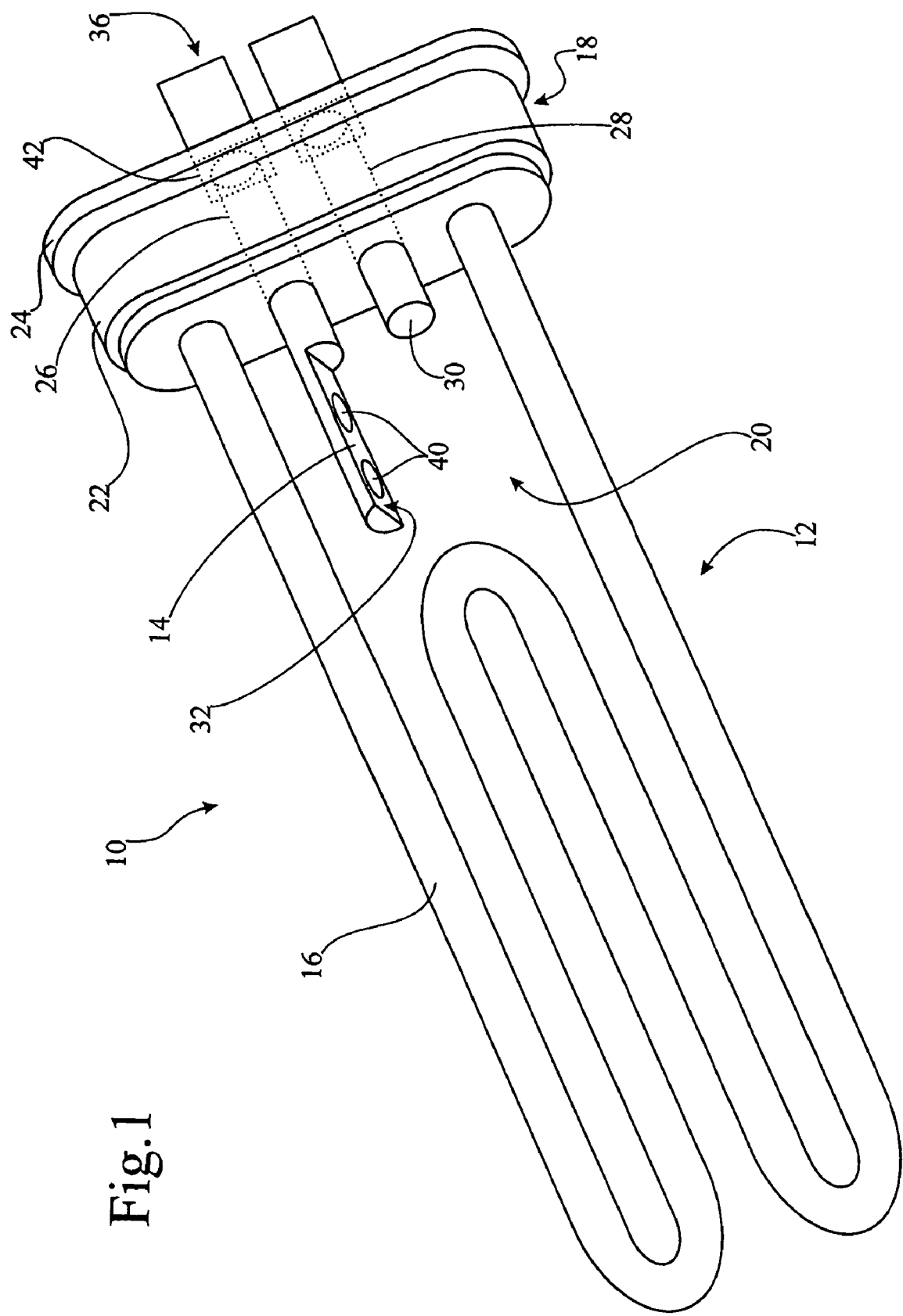
FIG. 1 discloses a view of one embodiment of the inventive device with a heating device and a conductivity measuring device.

FIG. 1 shows a device 10 according to the invention with a heating element 12 and a conductivity measuring device 14. The heating element 12 has a heater coil 16, which completely projects into the water to be heated, and a holder 18 which projects by roughly half into the water. The elongated heater coil 16 has a meandering configuration and forms a gap 20.

On the holder 18 is formed an elastic area 22, which in the fitted state of the device is located in a water passageway (not shown) in a recess in the wall thereof and provides a sealing action. On the holder 18 is also formed a flange 24 which, in the fitted state, engages and is fixed to, an outer face of the water-conducting wall. The holder 18 is provided with recesses 26, 28, shown in broken line form, for the corresponding, sealing reception of the conductivity measuring device 14 and, for example, a fuse 30 or the like. Both project into the gap 20. Other devices can be provided in these, or further, recesses.

Figure 2:
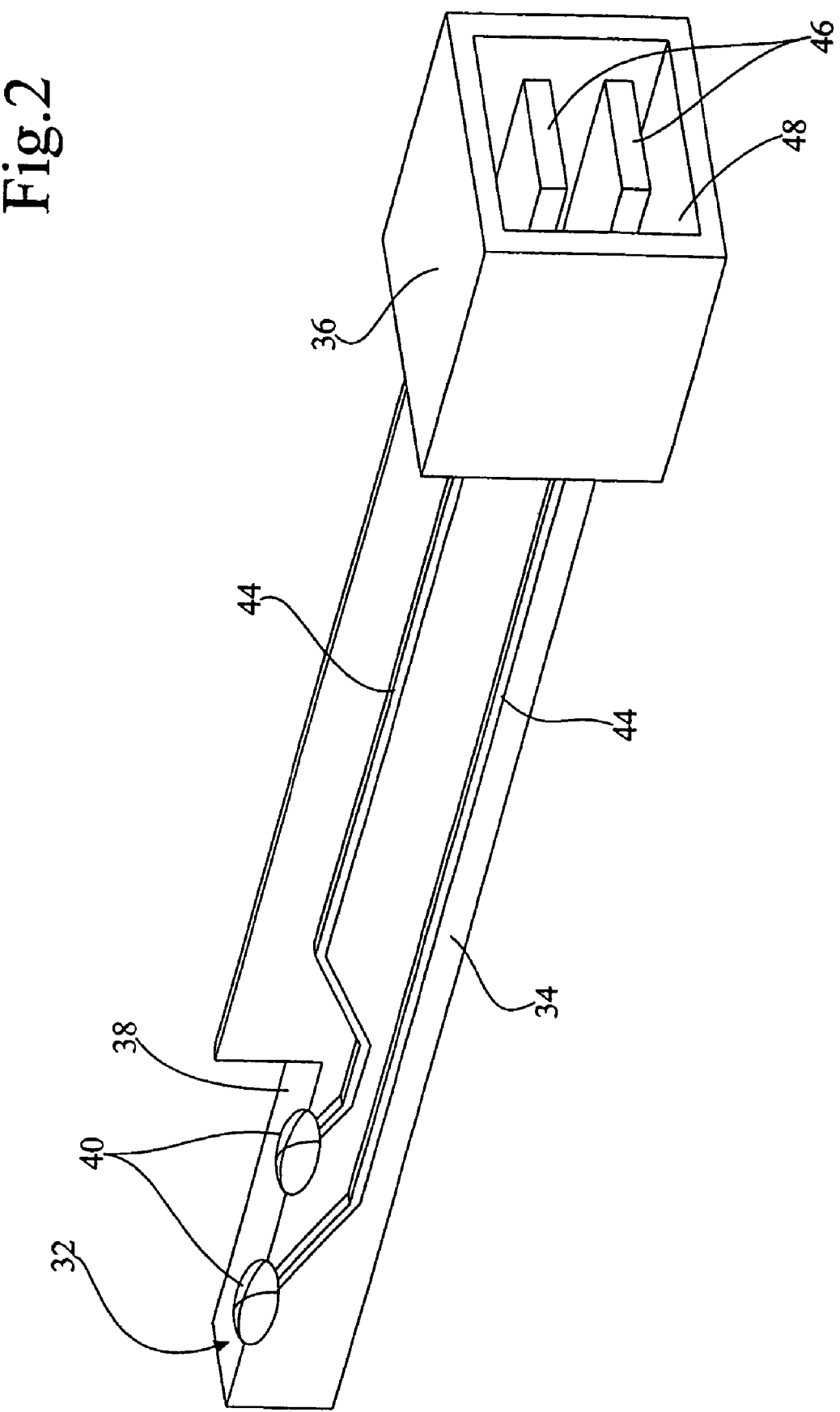
FIG. 2 discloses a larger scale view of a partial section through the conductivity measuring device.

The integrally constructed conductivity measuring device 14, as can be gathered from FIG. 2, has a sensor area 32, an elongated, substantially cylindrical pin 34, and an electrical terminal 36. The sensor area 32 is constructed as an extension of the pin 34, but is provided on its top surface with a flattened area 38, on which are located two flat electrodes 40 as sensors and are embedded therein. The electrodes 40 are roughly parallel and are placed roughly on a common plane, namely on the flattened surface 38. However, both the shape and the arrangement of the electrodes 40 can be in any other conceivable form.

At the opposite end of the pin 34, and in the extension thereof, is provided the terminal 36, which is preferably parallelepipedic and cup-shaped. The cross-sectional surface of the terminal 36 is larger than the cross-sectional surface of pin 34, so that terminal 36 has a fixing flange 42, which is shown in FIG. 1.

In each case, a connecting lead 44 passes from each of the electrodes 40 through pin 34 to terminal 36. The connecting leads 44 can, for example, be in wire or strand form and are provided at their ends remote from the electrodes 40 with connectors 46, which project into a cup-shaped recess 48 of terminal 36. The cup-shaped recess 48 and connectors 46 form a socket with which for connection purposes can engage a corresponding plug.

As is visible in FIG. 1, the pin 34 of conductivity measuring device 14 is introduced into the recess 26, shown in broken line form, in such a way that the sensor area 32 projects into gap 20 and the flange 42 engages on the outside of flange 24. The measuring device 14 in the construction described is so positioned that area 32 is oriented perpendicular to a plane defined by the heater coil 16. The orientation of the measuring device 14 with respect to said plane is generally dependent on the arrangement of the heating element 12 in the electrical appliance. It is advantageously chosen in such a way that area 32 is vertically oriented. In order to prevent an undesired twisting of measuring device 14, it is possible to provide in recess 26 a means preventing twisting, for example, as a positive engagement in the form of a spindle, which engages in a groove in pin 34.

Figure 3:
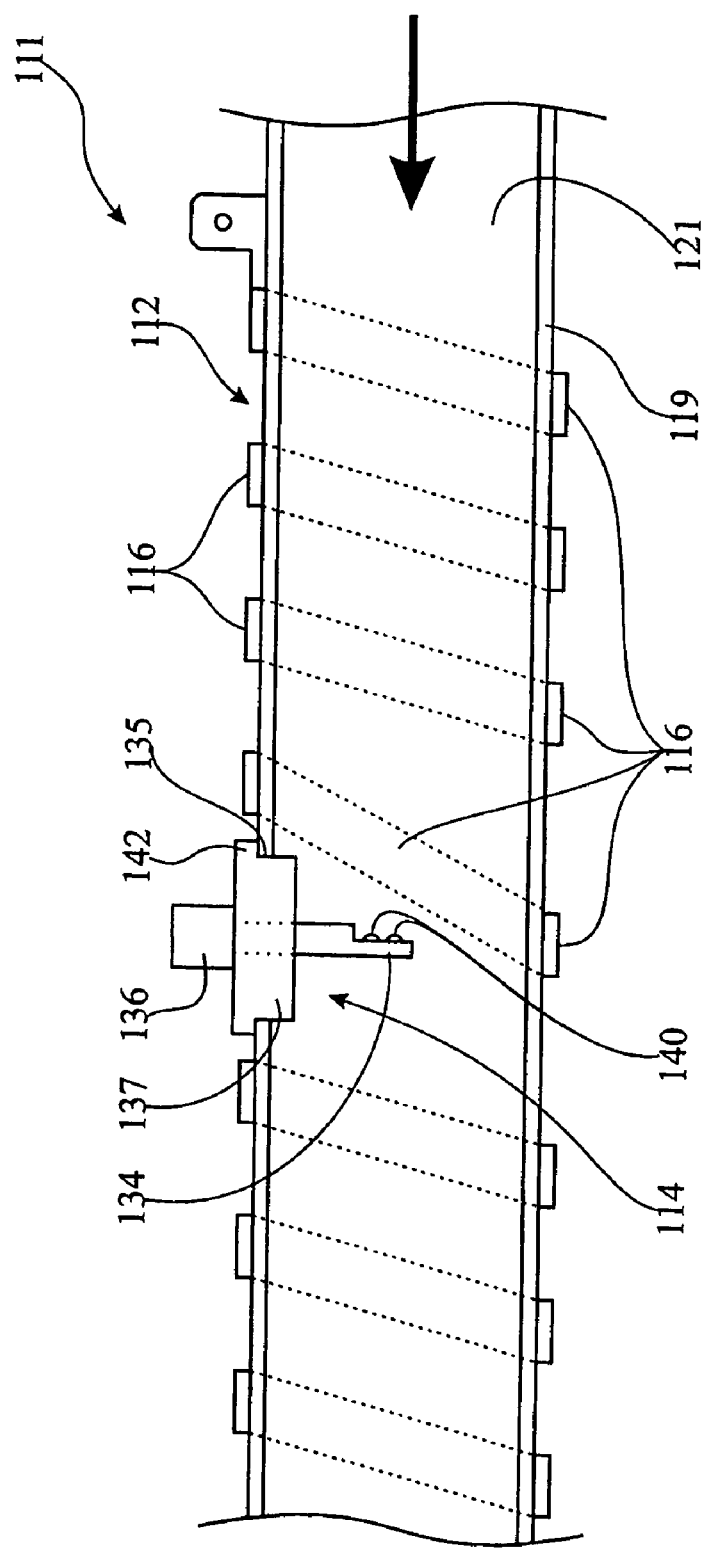
FIG. 3 discloses an alternative construction of a heating tube with an externally fitted heater and engaged conductivity measuring device.

FIG. 3 is a cross-section through heating tube 111. It comprises an externally insulated metal tube having a wall 119 comprising an inside surface and an outside surface wherein the inside surface forms a water passageway cross-section 121. Under the external insulation (not shown) is a spirally wound and fixed conductor along a portion of the tube, for example a bonded, flat, heating conductor wire 116 as heating device 112. It would also be possible here to apply alternatively, or in addition to, via direct printing means, a meandering thick-film heating resistor.

The metal tube 119 contains an opening 135 into which is introduced in sealing manner a conductivity measuring device 114, namely in a wider gap between the turns of the heating conductor wire 116. This sealing action is further improved by base 137, which externally passes into a flange 142. The base is placed in an accurately fitted manner, and in certain circumstances together with a seal, in opening 135. Terminal 136 projects from base 137.

The pin 134 with electrodes 140 projects into the tube 119 in such a way that it is positioned relatively centrally therein.

Thus, there is a particularly good flow against it by the water in the tube and said water for example flows from right to left.

Alternatively the electrodes can be fitted to a differently constructed pin in such a way that they are located relatively close to the inner wall of the metal tube 119. The pin then does not project or only projects to a minimum extent into the cross-section of tube 119 and is roughly parallel thereto. There is then a minimum hindrance or slowing down of the through-flow and less turbulence occurs. The electrodes can be juxtaposed or arranged in succession in the flow direction.

The invention claimed is:

1. A heating device for a water-conducting electrical appliance having a water passageway defined by a wall, said heating device having at least one heating element being located on an exterior surface of said wall or in said water passageway, wherein said wall of said water passageway has in vicinity of said heating device an opening and a measuring device measuring the electrical properties of water projects through said opening into said water passageway, wherein said measuring device has at least one terminal, a pin and at least two sensors located in a sensor area, wherein said sensors are constructed as capacitor plates and are used for determining a permittivity of water.

2. The heating device according to claim 1, wherein said heating element is positioned inside said water passageway using a holder, said measuring device being fixed in position by said holder and projecting into said water passageway.

3. The heating device according to claim 2, wherein a recess for receiving said measuring device is provided by said holder.

4. The heating device according to claim 1, wherein said heating element is placed on an outside of said wall and covers a portion of an outer surface of said wall.

5. The heating device according to claim 2, wherein said water passageway is tubular and said heating element is a heating conductor applied to an interior surface of said wall.

6. The heating device according to claim 4, wherein said measuring device projects as a single part comprising at least two sensors into said water passageway.

7. The heating device according to claim 1, wherein said sensors are covered with at least one corrosion-resistant material.

8. The heating device according to claim 1, wherein said sensor area is elongated.

9. The heating device according to claim 1, wherein said heating element is elongated and configured to define an area of free space in which said sensor area is located spaced apart from said heating element.

10. The heating device according to claim 1, wherein with said measuring device forms a preassemblable and disassemblable module.

11. The heating device according to claim 10, wherein a recess is provided in said holder and corresponds with said measuring device, which is placed in a watertight manner in said holder.

12. The heating device according to claim 11, wherein there is a twist-resistant connection between said measuring device and holder, said torsion preventer being constructed in such a way that said sensors of said measuring device are vertically oriented when said device is assembled.

13. The heating device of according to claim 4 wherein said heating element comprises a flat, resistive-heating conductor wire spirally wound around said wall.

14. A heating device for a water-conducting electrical appliance having a water passageway defined by a wall, said heating device having at least one heating element being located on an exterior surface of said wall or in said water passageway, wherein said wall of said water passageway has in vicinity of said heating device an opening and a measuring device measuring the electrical properties of water projects through said opening into said water passageway wherein an evaluating device is provided for evaluating sensor signals of said measuring device, said evaluating device being provided with a correction factor for correcting an established conductivity value falsified by a locally higher water temperature due to direct proximity to said heating element.

15. A heating device for a water-conducting electrical appliance comprising a tube comprising a wall with an exterior surface and an interior surface, the interior surface forming a water-passageway, said heating device having at least one heating element located in contact with said wall of said water passageway, said tube having in vicinity of said heating device an opening in the wall wherein a measuring device the electrical properties of water projects through said opening into said water passageway wherein said measuring device has at least one terminal, a pin and at least two sensors located in a sensor area, wherein said sensors are construed as capacitor plates and are used for determining a permittivity of water.

16. The heating device according to claim 15 wherein said heating element comprises a flat, resistive-heating conductor spirally wound around the exterior surface of said tube.

* * * * *

UNITED STATES PATENT AND TRADEMARK OFFICE
CERTIFICATE OF CORRECTION

PATENT NO. : 7,613,385 B2  Page 1 of 1
APPLICATION NO. : 11/354467
DATED : November 3, 2009
INVENTOR(S) : Muenzner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 366 days.

Signed and Sealed this

Nineteenth Day of October, 2010

David J. Kappos
*Director of the United States Patent and Trademark Office*